Aug. 13, 1957
O. F. TALLMAN
2,802,340
GROUND ROD DRIVER
Filed Sept. 1, 1954
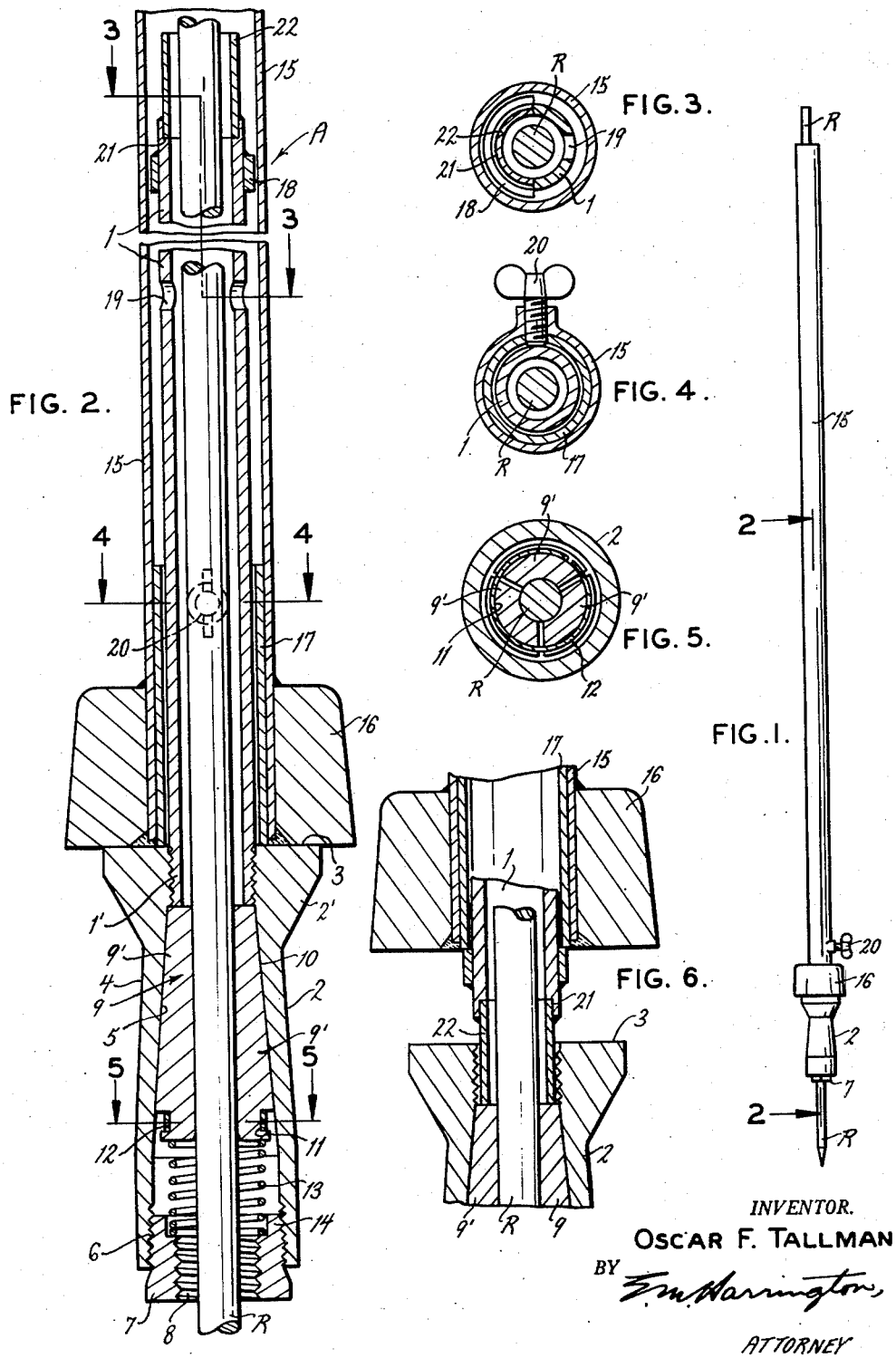
INVENTOR.
OSCAR F. TALLMAN
BY
*E. M. Harrington,*
ATTORNEY United States Patent Office 2,802,340
Patented Aug. 13, 1957

2,802,340

GROUND ROD DRIVER

Oscar F. Tallman, St. Louis, Mo., assignor to James R. Kearney Corporation, St. Louis, Mo., a corporation of Missouri Application September 1, 1954, Serial No. 453,647

8 Claims. (Cl. 61—73)

This invention relates generally to ground rod drivers of the type disclosed in U. S. Patent No. 2,693,086, issued November 2, 1954, in the names of Prosper C. Caruthers and Oscar F. Tallman, and more specifically to such a device which is of such improved construction and arrangement that it is capable of performing its intended function in an improved and highly efficient manner, the predominant object of the invention being to provide a ground rod driver which serves to eliminate the danger and awkwardness of the old-fashioned sledge hammer method of driving ground rods with its ever present danger of accidents due to missed sledge hammer blows, and which includes means for dislodging certain chuck members of the device in the event said chuck members become frozen in use with respect to a ground rod being driven with the aid of the device, or with respect to wall portions of the chuck housing within which said chuck members are disposed.

Fig. 1 is a vertical elevation of the improved ground rod driving device of this invention, showing same as it appears in use.

Fig. 2 is an enlarged, fragmentary, vertical section taken on line 2—2 of Fig. 1.

Fig. 3 is a horizontal section taken on staggered line 3—3 of Fig. 2.

Fig. 4 is a horizontal section taken on line 4—4 of Fig. 2.

Fig. 5 is a horizontal section taken on line 5—5 of Fig. 2.

Fig. 6 is a sectional view similar to Fig. 2 but showing the inner tubular member in its reversed position which it assumes when the chuck members are being dislodged from frozen positions.

In the drawing, wherein is shown for purposes of illustration, merely, one embodiment of the invention, A designates the improved ground rod driver generally. The ground rod driver A comprises an inner tubular member 1 which is externally screwthreaded at its lower end portion, as indicated at 1' in Fig. 2, and this screwthreaded lower end portion of said inner, tubular member screwthreadedly receives a chuck housing 2. The chuck housing 2 is provided at its upper end with an enlarged portion 2' which is provided with a flat top face 3, and said enlarged upper portion tapers downwardly, as indicated at 4, in Fig. 2, from its greatest diameter adjacent to its top to a smaller diameter at its bottom where said enlarged, upper portion merges into the body portion of the chuck housing. The body portion of the chuck housing is flared slightly for a portion of its length in order to provide the wall of the cylindrical chuck housing with a downwardly and outwardly inclined inner face 5 which serves a purpose to be hereinafter explained, and the wall of the lower portion of the chuck housing is preferably substantially parallel with respect to the major axis of the chuck housing. The lower end portion of the chuck housing is internally screwthreaded, as is shown at 6 in Fig. 2, and screwthreadedly receives a plug 7, this plug having a screwthreaded opening 8 formed longitudinally therethrough.

Disposed within the chuck housing 2 is a chuck structure 9 which is made up of a plurality of chuck members 9', three of these chuck members being shown in Fig. 5 as constituting a chuck structure, though more or even less than this number of chuck members may be employed. Each chuck member is arcuate in cross-section (see Fig. 5) and is tapered, or wedge-shaped, longitudinally, and when in their assembled form provide a cylindrical chuck structure. The outer faces 10 of the chuck members are inclined in accordance with the inclination of the inner face 5 of the wall of the body portion of the chuck housing, and said outer faces 10 of the chuck members contact with said inner face 5 of the wall of the chuck housing. Also, the chuck members 9' are provided with recesses which are brought into alinement with each other to provide the complete chuck structure with an annular recess 11 that receives a split ring 12 which retains the chuck members in their properly positioned relationship to provide the chuck structure. Additionally, a coil spring 13 is interposed between the lower faces of the assembled chuck members and an annular shoulder 14 formed within the plug 7 and this coil spring performs a function to be hereinafter set forth.

The ground rod driver A of this invention includes an outer tubular member 15 which embraces the inner tubular member 1, and fixed to said outer, tubular member 15, at the lower end of the wall thereof, is a hammer 16 of considerable weight. The outer tubular member 15 has fixed within same a tubular abutment element 17, and the inner tubular member 1 has fixed thereto in embracing relation with respect to the wall thereof, adjacent to the upper end of said inner tubular member an abutment element 18 in the form of a collar which serves a purpose to be hereinafter set forth. Also, the inner tubular member 1 has formed in the wall thereof one or more openings 19 through which the position of ground rod R being driven with the aid of the driver A may be viewed, and the shank of a set screw 20 is screwthreadedly seated in a screwthreaded opening formed in a boss projected outwardly from the outer surface of the wall of the outer tubular member 15, the inner end of the shank of said set screw being adapted to be screwed into binding contact with the outer surface of the inner tubular member 1 for retaining said outer tubular member and said inner tubular member in fixed positions with respect to each other when the driver is not in use, as for transportation or storage. Also, the inner tubular member 1 is provided with a recess 21 at an end thereof which receives an end portion of a relatively short tubular element 22, an end of said short tubular element abutting against the shoulder at the bottom of said recess, and said short tubular element being welded, or otherwise secured to the inner tubular member 1. The inner tubular member additionally has welded, or otherwise secured exteriorly thereto the collar 18 adjacent to its recessed end, which collar has been previously mentioned herein.

In the use of the improved ground rod driver of the present invention a ground rod R is fed into the driver from the handle end, which is the end shown at the top of Fig. 1, and the rod, after passing through the clutch structure, is permitted to extend beyond the plug 7 at the lower end of the chuck housing 2 about fifteen inches. The driver A is then elevated to a substantially vertical position at the location where the rod is to be driven and the rod is started into the ground by raising the outer tubular member 15 and the hammer 16 attached thereto to cause the hammer 16 to be located about a foot above the top face 3 of the chuck housing 2 and then striking it down against the chuck housing. This hammering motion is repeated until the chuck housing 2 is within four or five inches of the ground, at which time the chuck structure is raised with respect to the ground rod by jerking the outer tubular handle member upwardly so as to cause the top edge of the abutment 17 to strike the bottom edge of the abutment 18. This will cause the inner tubular member 1, the chuck housing 2, and the chuck structure 9 to slide upwardly relative to the ground rod R a short distance and at the top of such upward movement the coil spring 13 will lock the chuck members in a new elevated position relative to the ground rod being driven with the aid of the driver. The procedure described above is continued in the manner set forth, the chuck structure being repositioned when necessary until the upper end of the ground rod R is visible through a peep hole 19 in the inner tubular member 1. It is apparent that when the hammer 16 strikes the chuck housing 2 a downward blow the inclined inner face 5 of the chuck housing 2, coacting with the inclined outer faces of the chuck members 9', will cause the said chuck members to tightly grip the ground rod and drive it a distance into the ground.

Ground rods may be extracted from the ground with the aid of the same driver which is employed to drive them into the ground. To accomplish this the chuck housing is unscrewed from the lower screwthreaded end portion 1' of the inner tubular member 1 and said chuck housing is reversed end for end, the chuck housing being screwed on the screwthreaded lower end portion 1' of the inner tubular member by causing said screwthreaded portion 1' to screwthreadedly extend into the opening 8 of the plug 7. The driver is then arranged so that the chuck structure 9 engages the ground rod R to be extracted from the ground and the handle 15 is jerked upwardly so that the abutment 17 strikes the abutment 18 at the top of the stroke. This causes the chuck members to grip the ground rod and start to pull it out of the ground, such upward strokes being repeated until the rod is out of the ground, and the chuck structure being repositioned relative to the ground rod when necessary with sharp downward blows against the chuck housing. It is obvious that this procedure is the reverse of the rod driving procedure described above.

In the event the chuck members 9' become frozen in use to the ground rod R or to inner face portions of the wall of the chuck housing, or both, said chuck members may be dislodged by simply tightening the set screw 20 against the inner tubular member 1 so as to lock said inner tubular member 1 to the outer tubular member 15. The locked inner tubular member and outer tubular member are then rotated in the proper direction to unscrew the lower screwthreaded portion of the inner tubular member 1 from the internally screwthreaded upper portion of the chuck housing 2 whereupon the set screw 20 is released and the inner tubular member 1 is withdrawn from the outer tubular member 15 and is reversed end for end. The inner tubular member is passed downwardly over the ground rod R until the relatively short tubular element 22, which is now at the lower end of the inner tubular member, passes into the upper portion of the chuck housing and contacts with the top faces of the chuck members 9', and the outer tubular member 15 is then passed downwardly over the inner tubular member until the abutment 17 secured within the outer tubular member contacts with the collar 18 of the inner tubular member. The outer tubular member 15 is then moved upwardly and is moved downwardly into forcible contact with the collar 18 of the inner tubular member so as to drive the lower portion of said inner tubular member forcibly against the chuck members 9' in a manner to free said chuck members from the ground rod and from the wall of the chuck housing.

I claim:

1. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof which is adapted to extend into the upper portion of said chuck housing and contact with said chuck members, an abutment secured within said outer tubular handle member, and an abutment on said inner tubular member against which said abutment secured within said outer tubular handle member deals hammer blows to release said chuck members in the event they become stuck.

2. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof which is adapted to extend into the upper portion of said chuck housing and contact with said chuck members, a tubular abutment secured within said outer tubular handle member, and an abutment in the form of an annular collar on said inner tubular member against which said tubular abutment secured within said outer tubular handle member deals hammer blows to release said chuck members in the event they become stuck.

3. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof which is adapted to extend into the upper portion of said chuck housing and contact with said chuck members, a tubular abutment secured within said outer tubular handle member, and an abutment in the form of an annular collar fixed on said inner tubular member against which said tubular abutment secured within said outer tubular handle member deals hammer blows to release said chuck members in the event they become stuck.

4. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof in the form of an extension which is adapted to extend into the upper portion of said chuck housing and contact with said chuck members, a tubular abutment secured within said outer tubular handle member, and an abutment on said inner tubular member against which said tubular abutment secured within said outer tubular handle member deals hammer blows to release said chuck members in the event they become stuck.

5. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof in the form of an extension which is adapted to extend into the upper portion of said chuck housing and contact with said chuck members, a tubular abutment secured within said outer tubular handle member, and an abutment on said inner tubular member against which said tubular abutment secured within said outer tubular handle member deals hammer blows to release said chuck members in the event they become stuck, an end portion of said extension being seated in a recess formed in an end portion of said inner tubular member.

6. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof in the form of an extension which is adapted to extend into the upper portion of said chuck housing and contact with said chuck members, a tubular abutment secured within said outer tubular handle member, and an abutment on said inner tubular member against which said tubular abutment secured within said outer tubular handle member deals hammer blows to release said chuck members in the event they become stuck, an end portion of said extension being seated in a recess formed in an end portion of said inner tubular member, and means for securing said extension to said inner tubular member.

7. A unitary ground rod driver comprising an inner tubular member, a chuck housing attached to said inner tubular member, a plurality of chuck members disposed within said chuck housing, said chuck housing and said members being provided with coating inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof in the form of an extension which is adapted to extend into the upper portion of said chuck housing and contact with said chuck members, a tubular abutment secured within said outer tubular handle member, and an abutment on said inner tubular member against which said tubular abutment secured within said outer tubular handle member deals hammer blows to release said chuck members in the event they become stuck, an end portion of said extension being seated in a recess formed in an end portion of said inner tubular member, and means comprising welding for securing said extension to said inner tubular member.

8. A unitary ground rod driver comprising an inner tubular member, a chuck housing attached to said inner tubular member, a plurality of chuck members disposed within said chuck housing, said chuck housing and said chuck members being provided with coacting inclined faces which serve to force said chuck members inwardly in use of the ground rod driver, an outer tubular handle member embracing said inner tubular member, a hammer supported by said outer tubular handle member and adapted to deal hammer blows against said chuck housing on movement of said outer tubular handle member in one direction relative to said inner tubular member, said inner tubular member being reversible end for end within said outer tubular handle member and having a part at an end thereof in the form of an extension which is adapted to extend into the upper portion of said chuck housing and contact with said chuck members, a tubular abutment secured within said outer tubular handle member, and an abutment in the form of an annular collar embracing and fixed on said inner tubular member against which said tubular abutment secured within said outer tubular handle member deals hammer blows to release said chuck members in the event they become stuck, an end portion of said extension being seated in a recess formed in an end portion of said inner tubular member, and means for securing said extension to said inner tubular member.

References Cited in the file of this patent
UNITED STATES PATENTS 2,693,086    Caruthers et al. _____ Nov. 2, 1954